Sept. 11, 1956     W. H. CRUTCHER, JR     2,762,289
COFFEE ROASTING APPARATUS
Filed Oct. 9, 1950
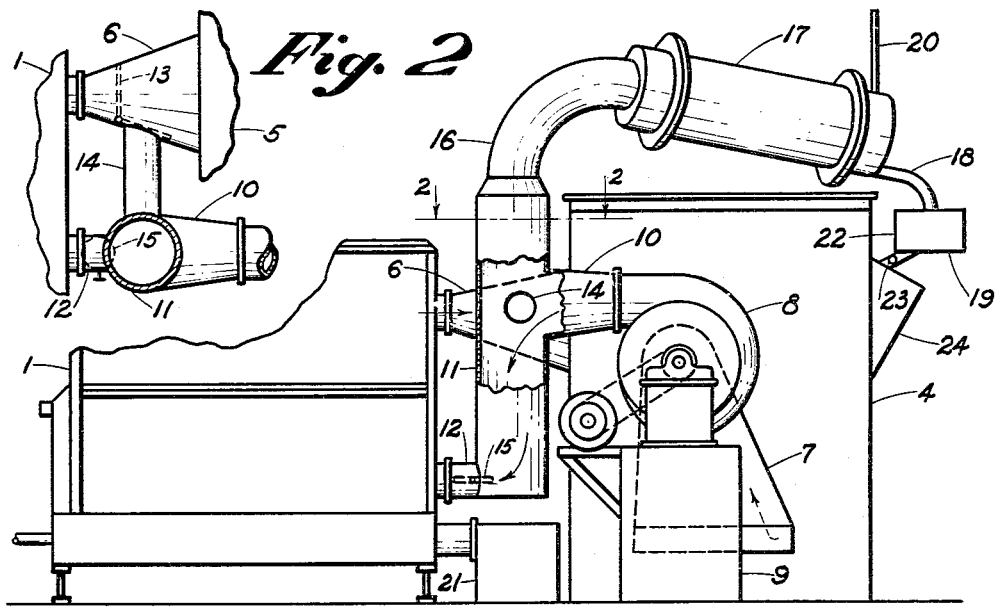
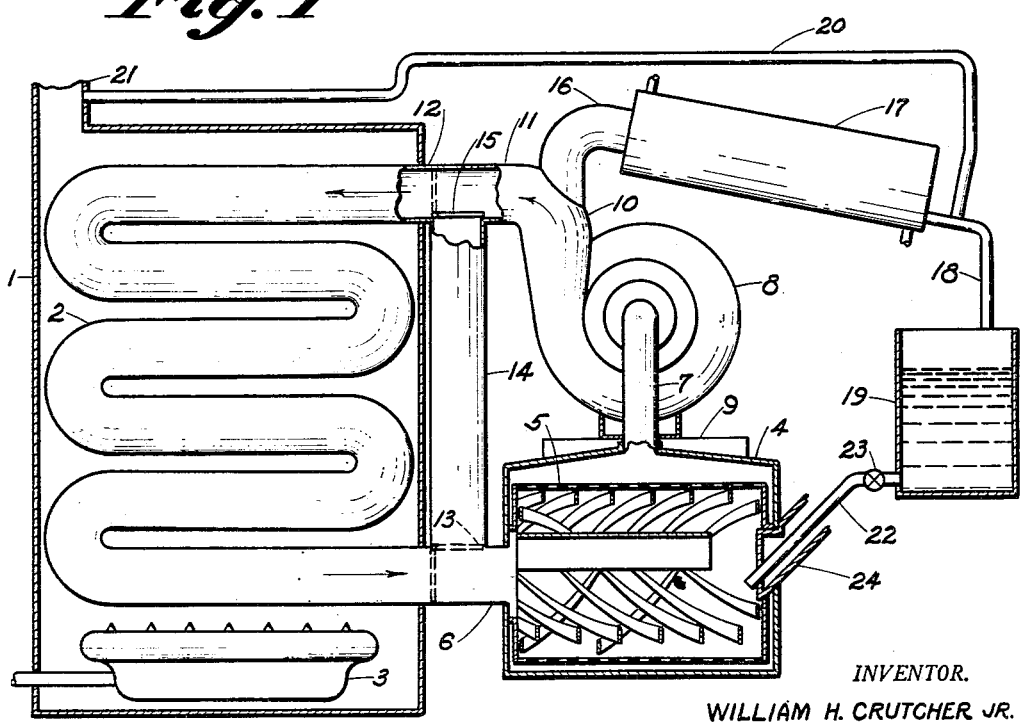
INVENTOR.
WILLIAM H. CRUTCHER JR.
BY Arthur H. Robert
ATTORNEY.

United States Patent Office 2,762,289
Patented Sept. 11, 1956

2,762,289

COFFEE ROASTING APPARATUS

William H. Crutcher, Jr., Louisville, Ky., assignor to Coffee Research, Inc., Louisville, Ky., a corporation of Kentucky Application October 9, 1950, Serial No. 189,260

7 Claims. (Cl. 99—236)

In the roasting of coffee as commercially practiced, the coffee is heated in a roaster by an exposed gas flame, and the products of combustion together with the chaff and volatile matter evolved from the coffee escape to the atmosphere. The coffee loses considerable weight in this operation, and in addition, the dust and vapors discharging into the air result in a nuisance. Roasting with indirect or conduction heating involves the danger of local overheating and scorching the coffee, so that roasting by means of heated gas therefore is generally recognized as the most desirable procedure. It has been proposed to condense the volatile matter evolved from the coffee and quench the coffee with the resulting condensate. This reduces the loss of weight of the coffee, but renders impractical the exposed gas flame type of heating because the products of combustion would contaminate the condensate.

Quenching by condensate requires that the condenser be connected to the quenching chamber because the condensate is revolatilized in this operation and must in turn be recondensed and returned as a quench. However, the large amount of chaff evolved during the quenching operation tends to plug the condenser, and the chaff evolved during the roasting operation causes this same difficulty. The usual type of dust collector discharging to atmospheric air requires the application of suction to draw air through the separator, and when hot air is employed to roast the coffee this causes high heat losses, because all the air employed to heat the coffee must be cooled to condense the volatile matter evolved from the coffee.

It is an object of the present invention to provide a coffee roasting and quenching apparatus employing heated gas to roast the coffee and allowing the volatile matter evolved to be condensed from the gas and employed for quenching without cooling the gas required for heating.

A further object is the provision of a coffee roasting apparatus employing hot gas to heat the coffee, wherein volatile matter is condensed without excessive heat losses, and the quenching by condensate is performed without removal of the coffee.

A further object is the provision of a coffee roasting and quenching apparatus wherein the chaff and dust are separated without excessive heat losses.

In accordance with the present invention, the roasting and quenching of the roasted coffee is carried out in apparatus employing a vented system equipped with a condenser, by passing a current of gas or vapor heated to a suitable temperature through the coffee, the gas being continuously circulated and reheated as required. In this system chaff, dust and other matter are removed from the circulating gas by a suitable separator to prevent escape thereof into the condenser, and only volatile matter which is evolved in the roasting operation escapes through the vent in the system where the condensible constituents are liquefied. The liquid portion is collected for return to the coffee during the quenching operation. When the coffee roasting operation is finished, the heating is discontinued and the coffee is quenched by adding the condensate to the coffee. In the quenching step large quantities of chaff are evolved and part of the condensate is again volatilized, and the chaff is removed while the volatile matter is recondensed and the condensate returned to quench the coffee until cooling is finished.

This apparatus enables the roasting operation and quenching of the coffee by condensate to be carried out with a number of benefits. There is a constant volume of gas or vapor circulating between the heater and the coffee in the roaster, and only excess vapors pass through the vent to the condenser. Thus, it is not necessary to cool all the circulating gaseous heating medium to condense the liquefiable vapors given off by the coffee, which results in a considerable saving of heat. Because the products of combustion of the fuel are not brought into contact with the coffee, there is no danger of contaminating the coffee, and any desired type of fuel may be employed. The temperature of the roasting air can be accurately controlled, and can be modulated if desired, so as to employ a high temperature at the beginning of the roast and a low temperature toward the end of the roast, or vice versa, as desired. Because the roasting is carried out at atmospheric pressure, no special pressure equipment is required, and products of combustion or unburned fuel gases cannot leak into the roasting chamber to create an explosion hazard or contaminate the coffee.

The invention will be described in greater detail in connection with the accompanying drawing illustrating a preferred apparatus by way of example for carrying out the invention, and wherein:

Figure 1 is a side elevation of a coffee roasting and quenching apparatus;

Figure 2 is a fragmentary plan view partly in section on line 2—2 of Figure 1, of the piping; and Figure 3 is a diagrammatic view of the apparatus shown in Figure 1.

Referring to the drawing, a heat exchanger 1 is provided, having a duct or passageway 2 for flow of a gaseous heating medium, such as air. This heating medium can be heated to the proper temperature by a gas burner 3, oil burner, or any other type of fuel burner. A roaster 4 comprises an outer housing having a perforate rotary cylinder 5 therein to hold the coffee. This cylinder may be equipped with internal baffles to cascade the coffee from the top to the bottom of the cylinder as the cylinder rotates. The heated medium enters the roaster by a duct 6 extending into the middle portion of cylinder 5, passes through the agitated coffee, and exits through the perforations in the cylinder and from the roaster by a return duct 7 having a dust separator 8 therein. The type of dust separator preferred is one embodying a combined fan and centrifugal separator, such as that illustrated by U. S. Patent 2,039,137 to Sylvan. The heating medium may be circulated by a fan, or by a thermal siphon action, or in any other desired manner. Chaff and dust removed from the circulating heating medium falls into the chaff box 9, and the spent heating medium passes by a duct 10 from the dust separator to a vertical duct 11 which connects to the intake 12 of the exchanger, which may have a damper 15 therein. A horizontal bypass duct 14 controlled by a damper 13 may be provided between the supply duct 6 and the return duct 11.

The closed circulating system formed by the heater 1, roaster 4, separator 8 and connecting ducts is provided with a vent connection leading to some condenser means. This vent connection includes duct 16 which preferably connects into the ductwork of the closed system between the discharge or clean gas side of separator 8 and the inlet of the heater 1. As shown, the duct 16 connects to duct 11 near the point where it receives cleaned gas from separator 8 and leads therefrom to condenser 17. This arrangement avoids chaff or dust entering the condenser. The condenser is cooled by water through suitable connections and the condensate passes by pipe 18 to a receiver 19 where it is stored till needed for quenching. A vent 20 is provided for the condenser, which may be connected into the furnace flue 21, if desired, so that incondensible vapors that pass therethrough are burned. A conduit 22 having a valve 23 therein leads from the receiver back to the roaster. Coffee is supplied to or discharged from the roaster through a door 24.

In operation, the roasting drum 5 is charged with coffee and rotated. Heated air from the heat exchanger is conducted to the center of the roaster by conduit 6 and the coffee cascading through the current of hot air is heated thereby. The air passes through the perforate drum 5 and by duct 7 to the dust separator 8 where chaff and dust are removed, and with the damper 15 cutting off the bypass, the air from the separator exhaust duct 10 returns by ducts 11 and 12 to the heat exchanger 1, where it is again heated. Thus the air is continuously circulated through a closed system between the roaster and heat exchanger. When the coffee begins to give off vapors, water vapors will be absorbed by the circulating air up to the saturation point, and excess water vapor as well as other vapors given off will pass through the dust separator 8. As only a substantially constant volume of air is kept in circulation (the air and other gases being free to expand) and this circulating air is kept substantially at or slightly higher than atmospheric pressure, excess vapors and gases pass through vent 16 to the condenser 17 where condensible vapors are liquefied, and the liquid flows to receiver 19 where it is collected. Excess incondensible vapors or gas escape by condenser vent 20 to keep a substantially constant pressure and volume in the system.

At the end of the roasting operation the damper 13 is moved to close the bypass 14, and damper 15 is moved to close duct 2 so that the gas exiting from conduit 10 cannot return to the heat exchanger. By thus cutting off the circulation of heating medium between the roaster and exchanger, the roaster can be employed as the quenching vessel and the heat exchanger can be maintained hot in readiness for roasting the next batch of coffee. Also, char deposits on the exchanger duct are eliminated. Gas from the dust separator discharge duct 10 passes through bypass 14 to the duct 6 and back to the roaster, and at the same time the vented conduit 16 and condenser remain in communication with the dust separator exhaust conduit 10. Valve 23 is opened to discharge the condensate into the coffee. This quickly cools or quenches the coffee, and the condensate which is revolatilized in this step passes off to the condenser where it is liquefied and returned by way of receiver 19 and conduit 22 to the coffee, to exert a further cooling effect thereon. This operation is continued until the coffee has been cooled sufficiently. In the quenching operation the coffee absorbs substantially all of the quenching liquid so that this liquid, containing a large part of the volatile coffee essence or aroma, is returned to the coffee. The quality of the coffee is improved and shrinkage is reduced as compared to other methods commercially employed for roasting and quenching. The coffee is now discharged from the roaster.

I claim as my invention:

1. A roasting and quenching apparatus for coffee comprising: a roasting chamber for receiving coffee to be roasted; an indirect air heater having an air inlet and an air outlet; a first conduit connected between the heater air outlet and roasting chamber for conducting heated air from said heater to said roasting chamber to heat the coffee therein; a second conduit connected between the heater air inlet and roasting chamber, said conduits forming with the heater and roasting chamber a closed circuit system for circulating air and gases evolved from the coffee between said roasting chamber and heater; a condenser connected to said second conduit and having a vent to the atmosphere at its discharge end, so that condensible gases evolved from the coffee enter and are condensed in the condenser, and permanent gases evolved from the coffee in excess of the capacity of the closed circuit system escape through the vent of the condenser to the atmosphere; and a blower in one of said conduits for circulating air and gases between said heater and roasting chamber.

2. An apparatus as specified in claim 1 wherein: said blower is located in said second conduit between said roasting chamber and condenser connection; said blower being of the centrifugal dust separator type to separate dust from the circulating gases.

3. An apparatus as specified in claim 2 having: a receiver for condensate connected to the discharge end of said condenser; and a valved conduit connecting said receiver to said roasting chamber for supplying condensate to the roasting chamber during quenching of the coffee therein.

4. An apparatus as specified in claim 1 having: a bypass conduit connected to said first conduit between said heater and roasting chamber, and to said second conduit between said heater and condenser connection, to form with said roasting chamber, blower, and first and second conduits, a second recirculating system bypassing the heater; and damper means in said conduits operable to close off the heater from said second recirculating system.

5. A roasting and quenching apparatus for coffee comprising: a roasting chamber for receiving coffee to be roasted; an indirect air heater having an air inlet and an air outlet; a first conduit connected between the heater air outlet and roasting chamber for conducting heated air from said heater to said roasting chamber to heat the coffee therein; a second conduit connected between the heater air inlet and roasting chamber, said conduits forming with the heater and roasting chamber a closed circuit system for circulating air and gases evolved from the coffee between said roasting chamber and heater; a condenser connected to said second conduit and having a vent to the atmosphere, so that condensible gases evolved from the coffee enter and are condensed in the condenser, and gases evolved from the coffee in excess of the capacity of the closed circuit system escape through the vent of the condenser to the atmosphere; and a blower in one of said conduits for circulating air and gases between said heater and roasting chamber.

6. A roasting and quenching apparatus for coffee comprising: a roasting chamber for receiving coffee to be roasted; an indirect air heater having an air inlet and an air outlet; a first conduit connected between the heater air outlet and roasting chamber for conducting heated air from said heater to said roasting chamber to heat the coffee therein; a second conduit connected between the heater air inlet and roasting chamber, said conduits forming with the heater and roasting chamber a closed circuit system for circulating air and gases evolved from the coffee between said roasting chamber and heater; a condenser connected to said second conduit and having a vent to the atmosphere, so that condensible gases evolved from the coffee enter and are condensed in the condenser, and gases evolved from the coffee in excess of the capacity of the closed circuit system escape through the vent of the condenser to the atmosphere; and a blower in one of said conduits for circulating air and gases between said heater and roasting chamber, a receiver for condensate connected to the discharge end of said condenser; and a valved conduit connecting said receiver to said roasting chamber for supplying condensate to the roasting chamber during quenching of the coffee therein.

7. A roasting and quenching apparatus for coffee comprising: a roasting chamber for receiving coffee to be roasted; an indirect air heater having an air inlet and an air outlet; a first conduit connected between the heater air outlet and roasting chamber for conducting heated air from said heater to said roasting chamber to heat the coffee therein; a second conduit connected between the heater air inlet and roasting chamber, said conduits forming with the heater and roasting chamber a closed circuit system for circulating air and gases evolved from the coffee between said roasting chamber and heater; a condenser connected to said second conduit and having a vent to the atmosphere, so that condensible gases evolved from the coffee enter and are condensed in the condenser, and gases evolved from the coffee in excess of the capacity of the closed circuit system escape through the vent of the condenser to the atmosphere; and a blower in one of said conduits for circulating air and gases between said heater and roasting chamber, a by-pass conduit connected to said first conduit between said heater and roasting chamber, and to said second conduit between said heater and condenser connection, to form with said roasting chamber, blower, and first and second conduits, a second recirculating system by-passing the heater; a damper means operable to close communication between the blower and heater and another damper means operable to close off the by-pass conduit to the roasting chamber.

References Cited in the file of this patent

UNITED STATES PATENTS

| Number | Name | Date |
|---|---|---|
| 493,606 | Trillich | Mar. 14, 1893 |
| 514,265 | Jaeger | Feb. 6, 1894 |
| 764,226 | Cottrell | July 5, 1904 |
| 1,179,192 | Kleinschmidt | Apr. 11, 1916 |
| 1,319,764 | Fullard | Oct. 28, 1919 |
| 1,340,692 | Wilcox et al. | May 18, 1920 |
| 1,981,234 | Hetzer | Nov. 20, 1934 |
| 1,991,190 | Backer et al. | Feb. 12, 1935 |
| 1,991,564 | McLain et al. | Feb. 19, 1935 |
| 2,002,094 | Meade | May 21, 1935 |
| 2,064,084 | Sando | Dec. 15, 1936 |
| 2,087,602 | McCrosson | July 20, 1937 |
| 2,444,217 | Armentrout | June 29, 1948 |
| 2,497,501 | Himmel et al. | Feb. 14, 1950 |
| 2,614,043 | Lenz | Oct. 14, 1952 |